(12) United States Patent
Willenberg et al.

(10) Patent No.: US 7,593,140 B2
(45) Date of Patent: Sep. 22, 2009

(54) SYSTEM AND METHOD FOR GENERATING DYNAMICALLY MODIFIABLE TIMING CONTROL SIGNALS

(75) Inventors: William H. Willenberg, Salem, OR (US); Yan Ping Lim, Albany, OR (US)

(73) Assignee: Avego Technologies General IP (Singapore) Pte. Ltd., Singapore (SG)

( * ) Notice: Subject to any disclaimer, the term of this patent is extended or adjusted under 35 U.S.C. 154(b) by 1082 days.

(21) Appl. No.: 11/031,126

(22) Filed: Jan. 7, 2005

(65) Prior Publication Data

US 2006/0152771 A1    Jul. 13, 2006

(51) Int. Cl.
  *H04N 1/32*   (2006.01)
  *H04N 1/40*   (2006.01)
(52) U.S. Cl. .................. 358/471; 358/468; 455/44; 455/45
(58) Field of Classification Search .......... 358/404, 358/469, 1.17, 1.16, 3.23, 444, 522, 468, 358/471; 369/13.05; 365/230.01, 189.011, 365/189.04, 189.17; 455/44, 45, 46; 707/10; 712/32, 37; 715/733

See application file for complete search history.

(56) References Cited

U.S. PATENT DOCUMENTS

| | | | |
|---|---|---|---|
| 5,657,485 A * | 8/1997 | Streitenberger et al. | 712/245 |
| 6,816,102 B2 | 11/2004 | Pavicic | |
| 6,937,355 B1 * | 8/2005 | Miyazawa et al. | 358/1.14 |
| 2001/0038579 A1 * | 11/2001 | Isobe et al. | 369/30.11 |
| 2005/0088539 A1 * | 4/2005 | Nakazono et al. | 348/231.3 |
| 2005/0122402 A1 * | 6/2005 | Kumaki | 348/208.1 |

* cited by examiner

*Primary Examiner*—Jerome Grant, II

(57) ABSTRACT

A system and method for generating dynamically modifiable timing control signals. Timing waveforms can be changed, for each phase of control, by changing the contents of memory locations and start/stop indices. Parallel signals are generated from the output of the memory locations. The memory locations are accessed in a user-selected order by an index value. This technique of generating timing waveforms, and thus control signals, can be applied to, for example, pixel array development.

17 Claims, 6 Drawing Sheets

SYSTEM AND METHOD FOR GENERATING DYNAMICALLY MODIFIABLE TIMING CONTROL SIGNALS

BACKGROUND OF THE INVENTION

A digital camera collects light on an electronic image sensor during a selected time period in order to produce a digital image. Complementary Metal Oxide Semiconductor (CMOS) image sensors (such as those used in cell phone cameras) are generally formed of a grid of photosites (pixels) that convert light shining on them to electrical charges. These charges can then be measured and converted into digital numbers that indicate how much light hit each photosite. As the lens of the digital camera focuses the scene on the image sensor, some pixels record highlights, some shadows, and others record all of the levels of brightness in between. The brighter the light, the higher the electrical charge. When the selected time period has expired and the exposure is complete, the image sensor "remembers" the pattern it recorded. The various levels of charge are then converted to digital numbers that can be used to recreate the image. Systems that include CMOS image sensors generally include (1) the image sensor itself, i.e., arrays of pixels that convert light energy into analog electrical signals, (2) analog sensors and converters that extract the analog signals from the pixel array and convert them to digital signals for further processing, (3) a timing controller that generates detailed control signals for controlling the pixel array, analog sensors, and an image processor, and (4) an image processor that converts the digital signals into actual image data. The image sensor generally operates under the control of an external processor (e.g. a cell phone processor or other computer). The external processor can accept the image data and can perform appropriate operations. It can also direct the image sensor as to when to acquire an image and controls certain other operational parameters.

The technology of sensor pixels and related analog processing is rapidly evolving and is frequently sensitive to precise timing of control signals. Current systems control and process sensor pixels in a mask-determined silicon chip array, which can require a large expense and lead-time to implement modifications. Therefore, a system is needed in which the precise timing of control signals can be changed without changing a silicon chip array.

Prior approaches to changing control signal timing without silicon chip modifications usually involve one of two mechanisms:

(1) A set of start/stop registers with counter decoders for each control phase; or (2) A Random Access Memory (RAM) with a shift register for each signal.

These approaches have at least the following limitations. The first approach requires that the total number of pulses for each timing control signal and each timing control phase be known before the design is complete. The second approach requires multiple RAMs and shift registers for each timing control phase.

What is needed is a product and method that offer a means for generating a variety of signals in such a manner that the timing can be economically changed with some precision.

SUMMARY OF THE INVENTION

The problems set forth above as well as further and other problems are resolved by the present invention. The solutions and advantages of the present invention are achieved by the illustrative embodiments and methods described herein below.

The timing controller of the present invention can generate timing waveforms that can be changed, for each phase of control, by changing the contents of memory locations and start/stop indices. Parallel signals can be generated from the output of the memory locations. The memory locations can be accessed in a user-selected order by an index value. Operationally, the index value is initially set to the value in the start index, and is then compared to the value in the stop index. At each step, the contents of the memory location indicated by the index value are loaded into a signal location, thus determining the value of the output control signal until the next time the index value is updated. The number of parallel signals is limited only by the capabilities of the underlying hardware, for example, in the case of the use of RAM, the number of parallel signals can be limited by the RAM width. This technique of generating control signals can be applied to, for example, pixel array development, and to the control of strobes to an analog section and image processing section that operate in co-ordination with a pixel array.

For a better understanding of the present invention, reference is made to the accompanying drawings and detailed description. The scope of the present invention is pointed out in the appended claims.

DETAILED DESCRIPTION OF THE INVENTION

Figure 1:
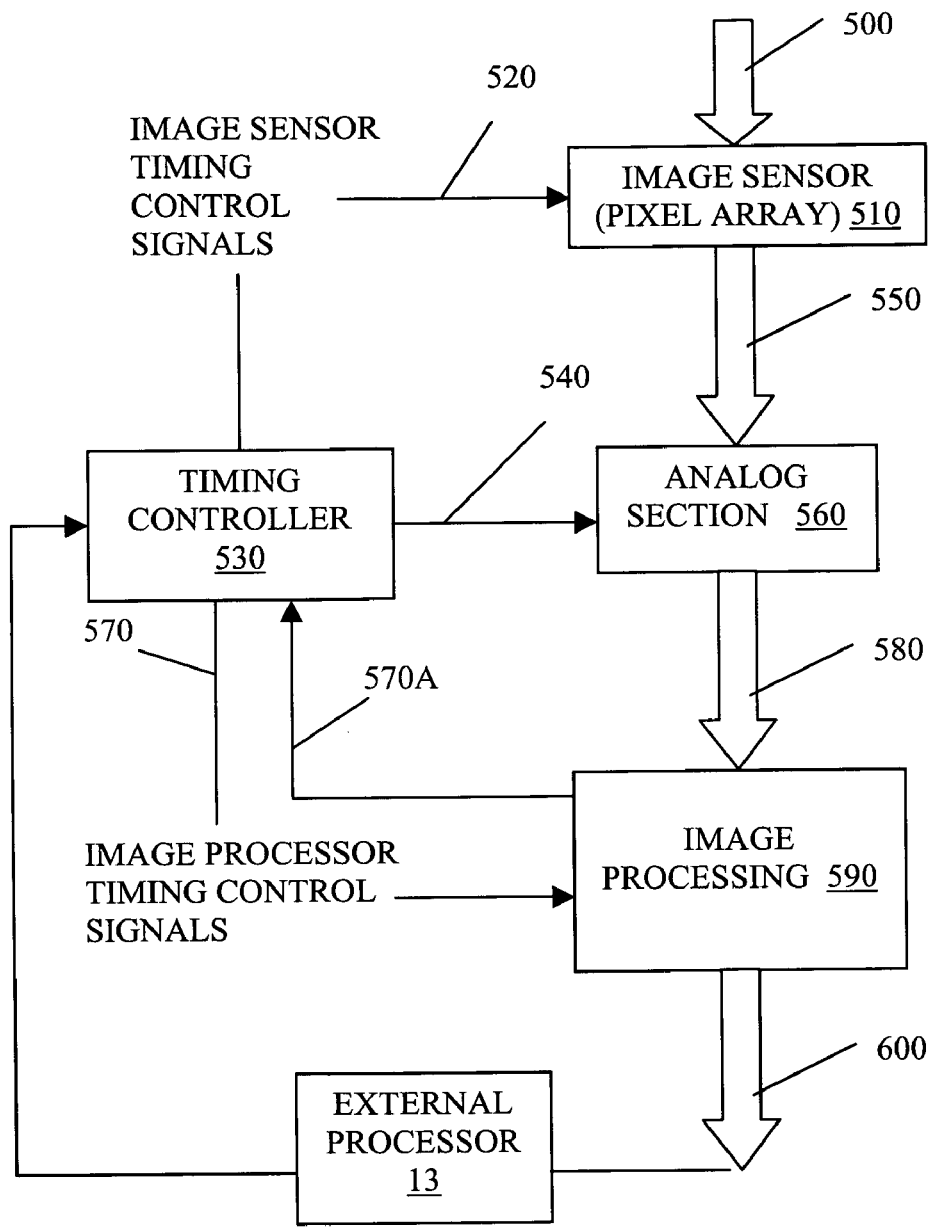
FIG. 1 (PRIOR ART) is a block diagram of the system in which the timing controller of the present invention operates.

The present invention is now described more fully hereinafter with reference to the accompanying views of the drawing, in which the illustrative embodiments of the present invention are shown.

Referring now to FIG. 1 (PRIOR ART), in order to understand the operational environment of the present invention, the following description is provided. CMOS image sensors (such as those used in cell phone cameras) generally include:

Image sensor 510 which is an array of pixels that can convert light energy 500 into analog signals 550;

Analog section 560 including sensors and converters that can extract analog signals 550 from image sensor 510 and convert them to digital signals 580 for further processing;

Timing controller 530 that can generate control signals, for example, image sensor control signals 520, analog control signals 540, and image processing control signals 570; and Image processor 590 that can convert digital signals 580 into image data 600.

Image sensor 510 generally operates under the control of external processor 13 (e.g. a cell phone processor or other computer). External processor 13 can accept image data 600 and can perform operations on image data 600. External processor 13 can also direct image sensor 510 to acquire an image and can control certain other operational parameters. In a CMOS image sensor 510, each row of pixels is subjected to at least two separate sequences of control signals: one to begin the light capture (referred to as integration start, which is equivalent to an open shutter stage in a single lens reflex camera), and the other to read (referred to as pixel sampling sequence) the light data captured in the row of pixels. Thus there are usually at least two sets of start/stop indices, one for each of these sequences. The term "operational phase" can refer to either the integration start sequence or the pixel sample sequence.

Figure 2:
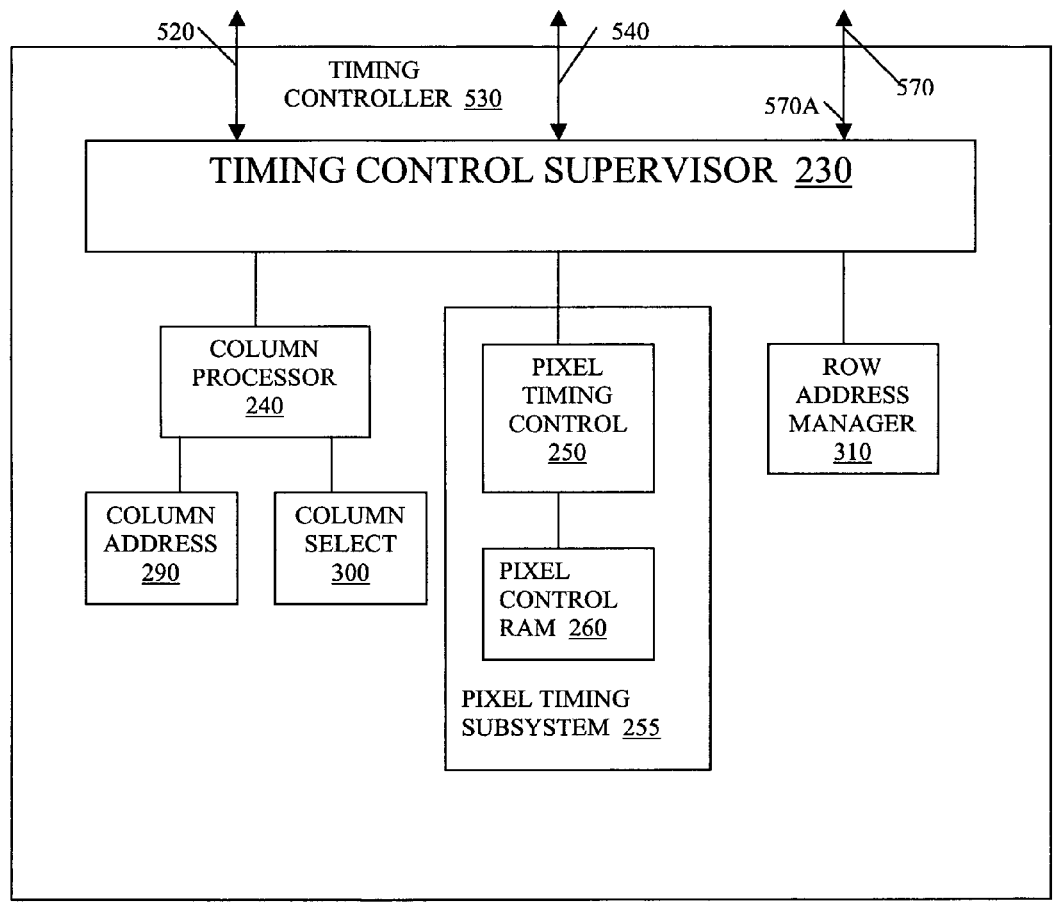
FIG. 2 is a block diagram showing the timing controller of the present invention that can be used in the context of an image sensor.

To further understand the operational environment of the present invention, and referring now to FIG. 2, timing controller 530 of the present invention can include, but is not limited to, timing control supervisor 230; a column processing section that can include, for example, column processor 240, column address generator 290, and column selection 300; row address manager 310 that controls the pixel row to which the array control signals are directed; and a pixel timing subsystem 255 that can include, for example, pixel timing control 250 and pixel control RAM 260. In the case of a large array of pixels (e.g. >1 megapixel) coupled with a much smaller number of analog processing channels (e.g. around 1, 2 or 4), only a certain number of pixels can be processed at a time. Row address manager 310 selects the row and column (s) from the array of pixels to be processed at a given time and informs analog section 560 when the columns have been selected. Timing control supervisor 230 can perform the primary sequencing, control, and interface functions for timing controller 530. Timing control supervisor 230 can control the functions of column processor 240, pixel timing control 250, row address manager 310. Timing control supervisor 230 can also direct the generation of processor/control signals 200, array signals 210, and analog processing signals 220. Image processor/control signals 200 can include control and parameter information from external processor 13 or from image processing 590.

Figure 3:
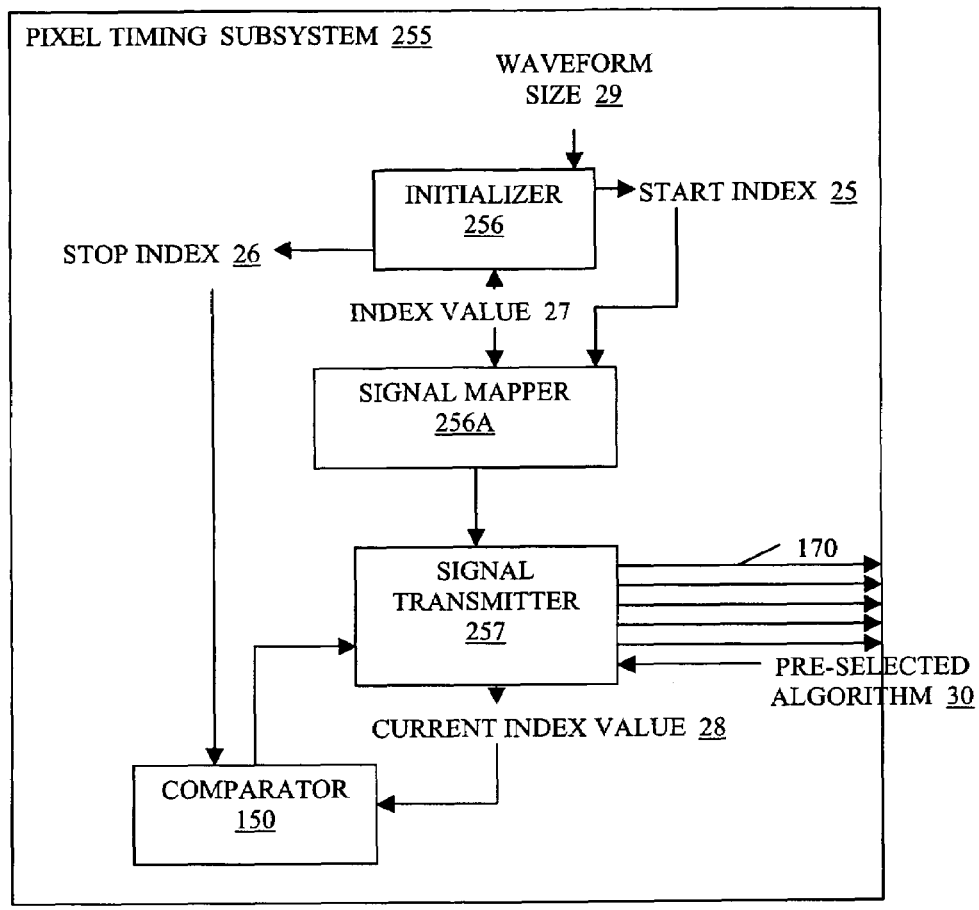
FIG. 3 is a functional block diagram showing pixel timing control of the present invention.
Figure 4:
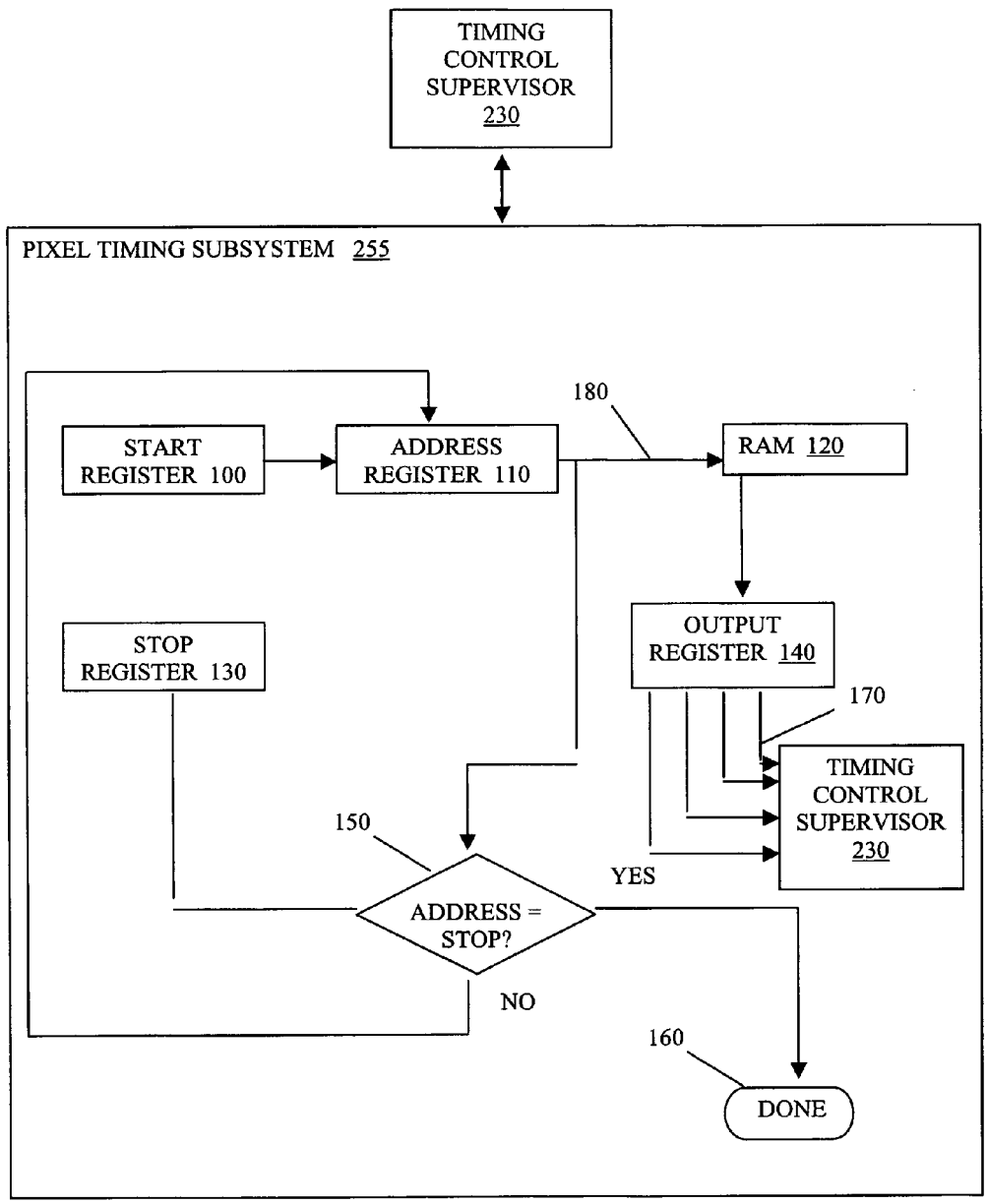
FIG. 4 is a functional block diagram showing an illustrative embodiment of a pixel timing controller that can be used to implement the pixel timing control of FIG. 3.

Referring now to FIG. 3, system 10 of the present invention can include, but is not limited to, pixel timing subsystem 255, which can include, but is not limited to, initializer 256, signal transmitter 257, and comparator 150. Initializer 256 sets the values of at least one start index 25 and at least one stop index 26 according to waveform size 29 of at least one parallel signal 170 and at least one index value 27. Signal mapper 256A converts at least one index value 27 into at least one parallel signal 170. Signal mapper 256A can be implemented, for example, in pixel control RAM 260 (FIG. 4). Signal transmitter 257 can transmit at least one parallel signal 170. Signal transmitter 257 provides at least one start index 25 as current index value 28 to comparator 150. Comparator 150 compares current index value 28 to at least one stop index 26 to determine the duration of at least one parallel signal 170. If current index value 28 does not match at least one stop index 26, comparator 150 returns control to signal transmitter 257. At this point, signal transmitter 257 determines another current index value 28 according to pre-selected algorithm 30, and provides that current index value 28 to comparator 150, which performs the comparison previously described. If current index value 28 matches at least one stop index 26, the waveform size 29 of at least one parallel signal 170 has been reached.

Referring now primarily to FIG. 4, pixel timing control 250 can include, but is not limited to, start register 100, stop register 130, RAM 120, RAM address register 110, output register 140, comparator 150 that compares RAM address register 110 to stop register 130, and output register 140 that receives the addressed contents of RAM 120 and drives the desired control signals. Note that there may be more than one start register 100 and more than one stop register 130 if there is more than one sequence depending on the operational phase (see above). Timing control supervisor 230 determines which start register 100 and which stop register 130 are to be used at a particular time. This determination is made prior to the start of a pixel control sequence. RAM 120, start register 100, and stop register 130 are generally loaded as part of a system initialization sequence and remain fixed until the next power on or other initialization. Parameters that determine the contents of RAM 120, start register 100, and stop register 130 can be provided by, for example, tables that can be stored in image processing 590 (FIG. 1) or they can be provided by, for example, external processor 13. The parameters can be loaded under the direction of timing control supervisor 230.

With further reference primarily to FIG. 4, pixel timing subsystem 255 can begin with a start command from the timing control supervisor 230 that can cause the contents of start register 100 to be loaded into RAM address register 110 and can cause a RAM 120 read cycle to begin in which address 180 is read from RAM 120. At the end of the RAM 120 read cycle, the output of RAM 120 is loaded into output register 140. Output register 140 can contain at least one parallel signal 170. The at least one parallel signal 170 can, in turn, control operations within the image sensor 510 (FIG. 1), analog sensors and converters 560 (FIG. 1), and image processing 590 (FIG. 1). The specific function of each at least one parallel signal 170 is determined by the hardware construction, but the detailed timing is arbitrarily determined by the contents of RAM 120. RAM address register 110 can be determined by, for example, incrementing RAM address register 110 at each clock cycle, after which, RAM address register 110 points to another value that is read out of RAM 120 and loaded into output register 140. At each clock cycle, comparator 150 compares the content of RAM address register 110 with the content of stop register 130. If the content of RAM address register 110 does not match the content of stop register 130, then the operation continues. If the content of RAM address register 110 matches the content of stop register 130, then a DONE signal 160 is sent to the timing control supervisor 230 and pixel timing control 250 operation is halted until timing control supervisor 230 provides a START signal.

Figure 5:
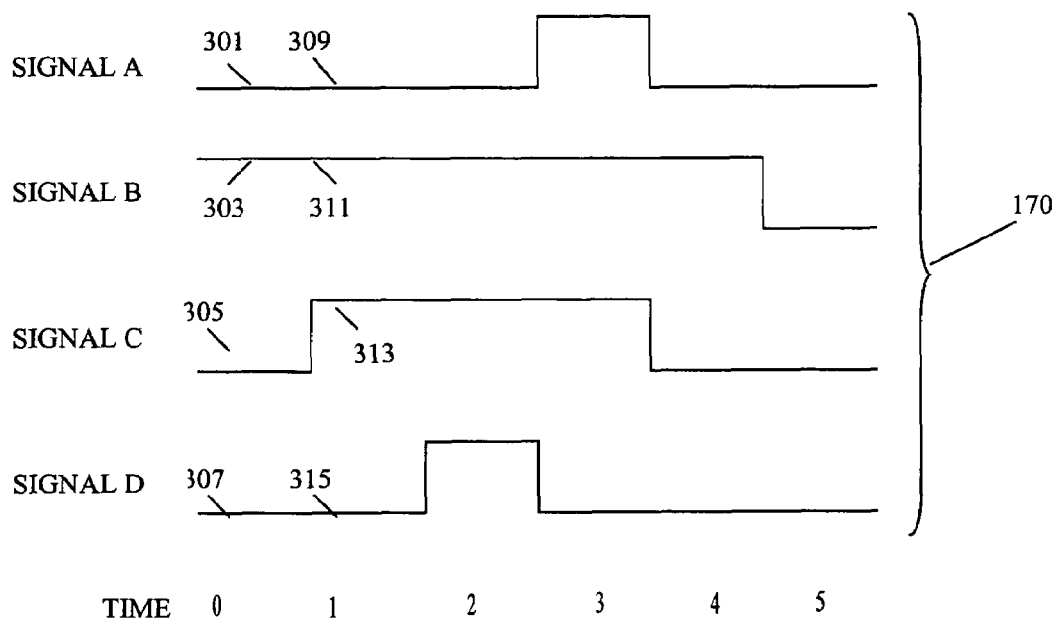
FIG. 5 is a signal sequence corresponding to the signal values shown in Table 1.

The following table is a sample of the content of RAM 120 used to generate a at least one parallel signal (270), and FIG. 5 illustrates a sample timing diagram for exemplary at least one parallel signal (ABCD) 170 (FIG. 4).

| RAM Address Register | Hex Content | Output Register |
|---|---|---|
| 0 | 0x4 | 0100 |
| 1 | 0x6 | 0110 |
| 2 | 0x7 | 0111 |
| 3 | 0xE | 1110 |
| 4 | 0x4 | 0100 |
| 5 | 0x0 | 0000 |

In this example, four parallel signals 170 are used. The duration of each at least one parallel signal 170 can be determined by waveform size 29 stored, for example, in pixel control RAM 260 (FIG. 4). The waveform size 29 can be, for example, a minimum of one cycle and a maximum of an entire sequence. The duration of a sequence of the at least one parallel signal 170 is determined by the difference between the contents of start register 100 (FIG. 4) and stop register 130 (FIG. 4). This approach is particularly useful when the technology of the devices having need of timing control is still evolving, since it allows the detailed timing to be determined at a time after the design is committed to silicon. For the example depicted in FIG. 5, timing control supervisor 230 (FIG. 4) generates a start command selecting address 0 (start register 100 contents) as the first address and address 5 (stop register 130 contents) as the last. At the start, 0 is loaded into the RAM address register 110 (FIG. 4), causing a 0100 to be loaded into output register 140 (FIG. 4). This causes the following output signals at Time 0:

Signal A-0 (Low) 301
Signal B-1 (High) 303
Signal C-0 (Low) 305
Signal D-0 (Low) 307

Since the RAM address register 110 (content=0) is not equal to stop register 130 (content=5), RAM address register 110 (FIG. 4) is incremented to a value of 1 and 0110 is loaded into output register 140 (FIG. 4). This causes the following output signals at Time 1:

Signal A-0 (Low) 309
Signal B-1 (High) 311
Signal C-1 (High) 313
Signal D-0 (Low) 315

This continues until RAM address register 110 is incremented to a value of 5 and 0000 is loaded into output register 140, causing all of the output signals to go low (0). At this time, RAM address register 110 is equal to stop register 130 (FIG. 4) (content=5), DONE signal 160 (FIG. 4) is sent to timing control supervisor 230 (FIG. 4), and pixel timing control 250 (FIG. 4) operation is halted.

Figure 6:
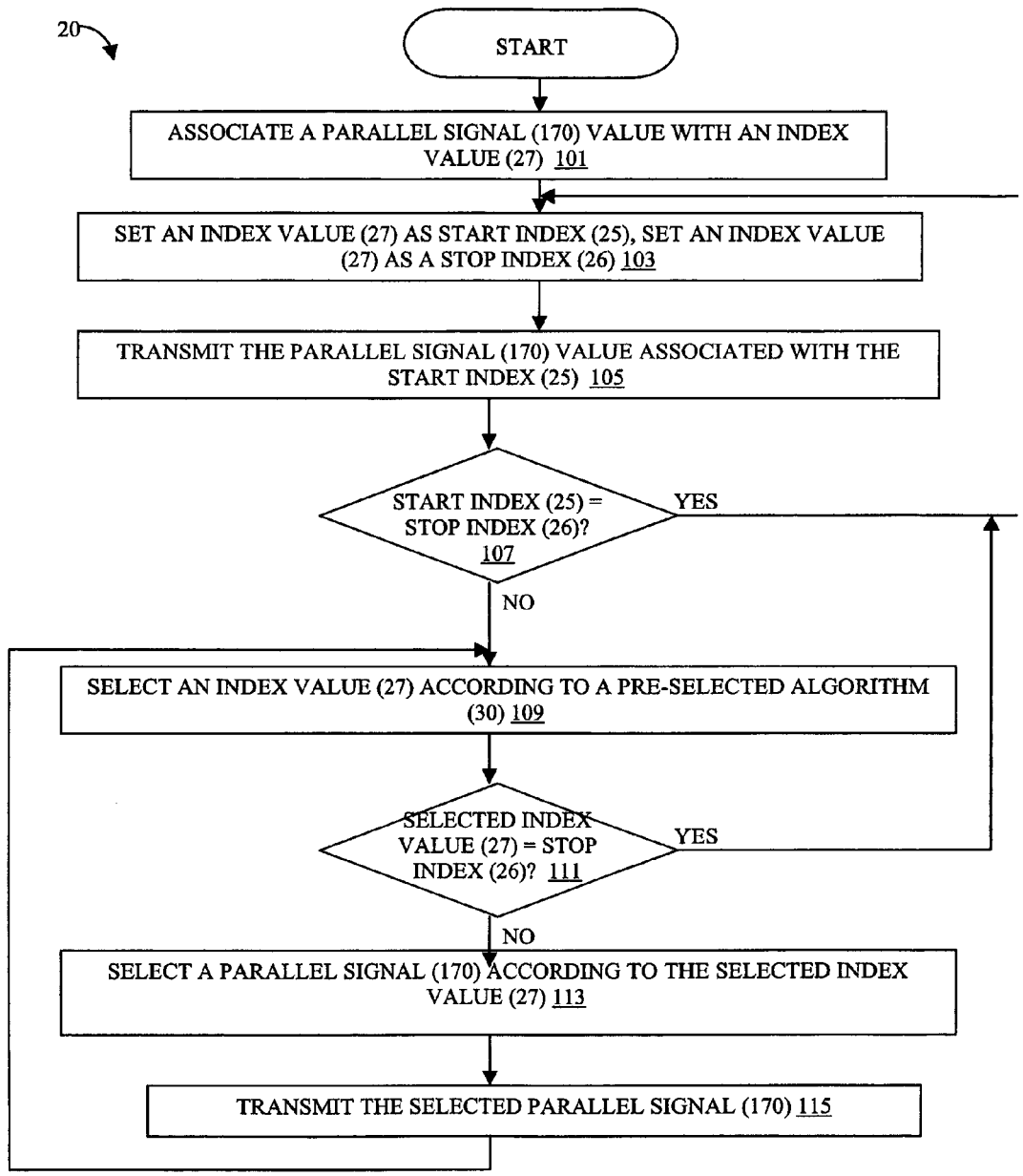
FIG. 6 is a flowchart of the method of the present invention.

Referring now primarily to FIG. 6, method 20 of the present invention can include, but is not limited to, the steps of associating at least one parallel signal 170 (FIG. 3) with at least one index value 27 (FIG. 3) (method step 101), setting at least one index value 27 as at least one start index 25 (FIG. 3), and setting at least one index value 27 as at least one stop index 26 (FIG. 3) (method step 103). Method 20 can further include the step of transmitting at least one parallel signal 170 associated with at least one start index 25 (method step 105). If at least one start index 25 matches at least one stop index 26 (decision step 107), method 20 continues execution at method step 103. If at least one start index 25 does not match at least one stop index 26 (decision step 107), method 20 can further include the step of selecting at least one index value 27 according to a pre-selected algorithm 30 (FIG. 3) (method step 109). If the selected at least one index value 27 matches the at least one stop index 26 (decision step 111), method 20 continues execution at method step 103. If the selected at least one index value 27 does not match at least one stop index 26 (decision step 111), method 20 can further include the steps of selecting at least one parallel signal 170 according to the selected at least one index value 27 (method step 113), transmitting the selected at least one parallel signal 170 (method step 115), and continuing execution with method step 109. Method 20 can be, in whole or in part, implemented electronically. Signals representing actions taken by elements of system 10 (FIG. 3) can be electronically executed and stored on at least one computer-readable medium. Common forms of at least one computer-readable medium can include, for example, but are not limited to, a floppy disk, a flexible disk, a hard disk, magnetic tape, or any other magnetic medium, a CDROM or any other optical medium, punched cards, paper tape, or any other physical medium with patterns of holes, a RAM, a Programmable Read Only Memory (PROM), and Editable PROM (EPROM), a FLASH-EPROM, or any other memory chip or cartridge, a carrier wave, or any other medium from which a computer can read.

Although the invention has been described with respect to various embodiments and methods, it should be realized that this invention is also capable of a wide variety of further and other embodiments and methods within the spirit and scope of the appended claims.

What is claimed is:

1. A method for generating dynamically modifiable timing control signals from at least one parallel signal of a waveform size according to a pre-selected algorithm stored in a computer-readable medium, comprising:
    (a) associating the at least one parallel signal with at least one index value:
    (b) setting the at least one index value as a start index and the at least one index value as a stop index according to the waveform size;
    (c) transmitting the at least one parallel signal associated with the start index;
    (c) selecting the at least one index value according to the pre-selected algorithm;
    (e) transmitting the at least one parallel signal associated with the selected at least one index value;
    (f) repeating steps (d)-(e) until the selected at least one index value matches the stop index.

2. The method as defined in claim 1, further comprising:
    storing the at least one index value in an address register;
    storing the start index in a start register; and
    storing the stop index in a stop register.

3. The method as defined in claim 1, further comprising:
    storing the at least one parallel signal in a Random Access Memory (RAM); and
    moving the at least one parallel signal associated with the at least one index value from the RAM to an output register.

4. The method as defined in claim 1, further comprising:
    defining the pre-selected algorithm to produce at least one image sensor timing control signal;
    generating the at least one image sensor timing control signal from the at least one parallel signal; and
    transmitting the at least one image sensor timing control signal to an image sensor.

5. The method as defined in claim 1, further comprising:
    defining the pre-selected algorithm to produce at least one analog timing control signal;
    generating the at least one analog timing control signal from the at least one parallel signal; and
    transmitting the at least one analog timing control signal to an analog section.

6. The method as defined in claim 1, further comprising:
    defining the pre-selected algorithm to produce at least one image processor timing control signal;
    generating the at least one image processor timing control signal from the at east one parallel signal; and
    transmitting the at least one image processor timing control signal to an image processor.

7. A system for generating dynamically modifiable timing control signals from at least one parallel signal associated with a pre-selected algorithm of waveform size stored in a computer-readable medium, comprising:

an initializer capable of associating at least one start index with at least one index value, said initializer capable of associating at least one stop index with said at least one index value;

a signal transmitter capable of transmitting the at least one parallel signal associated with said at least one start index, said signal transmitter capable of associating a current index value with said at least one index value according to the pre-selected algorithm, said signal transmitter capable of transmitting the at least one parallel signal associated with said current index value;

a comparator capable of determining the waveform size according to a comparison between said at least one stop index and said current index value; and said signal transmitter is capable of transmitting the at least one parallel signal until said comparator determines the at least one parallel signal has substantially reached the waveform size.

8. The system as defined in claim 7 further comprising:

a timing controller including said initializer, said signal transmitter, and said comparator, said timing controller capable of converting the at least one parallel signal to at least one image sensor timing control signal according to the pre-selected algorithm; and an image sensor capable of receiving said at least one image sensor timing control signal, said image sensor capable of receiving electromagnetic energy, said image sensor capable of generating and transmitting at least one analog signal, said image sensor capable of receiving control signals from an external processor.

9. The system as defined in claim 7 further comprising:

a timing controller including said initializer, said signal transmitter, and said comparator, said timing controller capable of converting said at least one parallel signal to at least one analog timing control signal according to the pre-selected algorithm; and an analog section capable of receiving at least one analog signal from an image sensor, said analog section capable of receiving said at least one analog timing control signal, said analog section capable of generating and transmitting at least one digital signal.

10. The system as defined in claim 7 further comprising:

a timing controller including said initializer, said signal transmitter, and said comparator, said timing controller capable of converting the at least one parallel signal to at least one image processor timing control signal according to the pre-selected algorithm; and an image processor capable of receiving said at least one image processor timing control signal, said image processor capable of receiving at least one digital signal from an analog section, said image processor capable of generating and transmitting image data to an external processor.

11. A method for generating dynamically modifiable timing control signals from at least one parallel signal of arbitrary waveform size comprising:

(a) loading the contents of at least one start register and at least one stop register with pre-selected index values associated with the arbitrary waveform size;

(b) accessing the at least one parallel signal through a Random Access Memory (RAM) read cycle by loading the contents of the at least one start register into the RAM address register;

(c) moving the result of the RAM read cycle into an output register;

(d) transmitting the at least one parallel signal associated with the output register;

(e) modifying the RAM address register according to a pre-selected algorithm to access the at least one parallel signal through a RAM read cycle; and (f) repeating steps (c)-(e) until the RAM address register matches the at least one stop register.

12. A system for generating dynamically modifiable timing control signals from at least one parallel signal of a waveform size according to a pre-selected algorithm stored in a computer-readable medium, comprising:

means for associating the at least one parallel signal with at least one index value;

means for setting said at least one index value as a start index and said at least one index value as a stop index according to the waveform size;

means for transmitting the at least one parallel signal associated with said start index;

means for selecting said at least one index value according to the pre-selected algorithm;

means for transmitting the at least one parallel signal associated with said selected at least one index value;

means for repeating said means for selecting and said means for transmitting the at least one parallel signal associated with said selected at least one index value until said selected at least one index value matches said stop index.

13. The system as defined in claim 12 further comprising:

means for storing said at least one index value in an address register;

means for storing said start index in a start register; and means for storing said stop index in a stop register.

14. The system as defined in claim 12 further comprising:

means for storing the at least one parallel signal in Random Access Memory (RAM); and means for moving said at least one parallel signal associated with said at least one index value from said RAM to an output register.

15. The system as defined in claim 12 further comprising:

means for defining the pre-selected algorithm to produce at least one image sensor timing control signal;

means for generating said at least one image sensor timing control signal from said at least one parallel signal; and means for transmitting said at least one image sensor timing signal to an image sensor.

16. The system as defined in claim 12 further comprising:

means for defining the pre-selected algorithm to produce at least one analog timing control signal;

means for generating said at least one analog timing control signal from said at least one parallel signal; and means for transmitting said at least one analog timing control signal to an analog section.

17. The system as defined in claim 12 further comprising:

means for defining the pre-selected algorithm to produce at least one image processor timing control signal;

means for generating said at least one image processor timing control signal from the at least one parallel signal; and means for transmitting said at least one image processor timing control signal to an image processor.

* * * * *

UNITED STATES PATENT AND TRADEMARK OFFICE
CERTIFICATE OF CORRECTION

PATENT NO. : 7,593,140 B2
APPLICATION NO. : 11/031126
DATED : September 22, 2009
INVENTOR(S) : William H. Willenberg et al.

It is certified that error appears in the above-identified patent and that said Letters Patent is hereby corrected as shown below:

Title Page, Column 1 (assignee's name), Line 1, Delete "Avego" and insert --Avago--.

Column 6, Line 20 (approx.), Claim 1, delete "value:" and insert --value;--.

Column 6, Line 26 (approx.), Claim 1, before "selecting" delete "(c)" and insert --(d)--.

Column 6, Line 61, Claim 6, delete "at east" and insert --at least--.

Signed and Sealed this
Twenty-fifth Day of September, 2012

David J. Kappos
*Director of the United States Patent and Trademark Office*